US012694693B2

(12) United States Patent
Higuchi

(10) Patent No.: US 12,694,693 B2
(45) Date of Patent: Jul. 28, 2026

(54) IMAGING STATE CONFIRMATION DEVICE

(71) Applicant: TOYOTA JIDOSHA KABUSHIKI KAISHA, Toyota (JP)

(72) Inventor: Kazuma Higuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/921,359

(22) Filed: Oct. 21, 2024

(65) Prior Publication Data

US 2025/0200998 A1       Jun. 19, 2025

(30) Foreign Application Priority Data

Dec. 15, 2023     (JP) ................................. 2023-211788

(51) Int. Cl.
| | |
|---|---|
| *H04N 5/00* | (2011.01) |
| *G06F 3/04817* | (2022.01) |
| *G06V 20/59* | (2022.01) |
| *G06V 40/16* | (2022.01) |

(52) U.S. Cl.
CPC ........ *G06V 20/597* (2022.01); *G06F 3/04817* (2013.01); *G06V 40/161* (2022.01)

(58) Field of Classification Search
USPC ......................................................... 348/148
See application file for complete search history.

(56) References Cited

U.S. PATENT DOCUMENTS

| | | | | |
|---|---|---|---|---|
| 9,227,568 | B1 * | 1/2016 | Hubbell | .................... B60R 1/28 |
| 9,805,275 | B2 | 10/2017 | Okuda | |

| | | | | |
|---|---|---|---|---|
| 10,525,981 | B2 | 1/2020 | Matsumura | |
| 10,579,056 | B2 | 3/2020 | Matsumura | |
| 10,649,452 | B2 | 5/2020 | Ichikawa et al. | |
| 10,706,299 | B2 | 7/2020 | Matsumura | |
| 10,814,880 | B2 | 10/2020 | Kishi | |
| 10,884,493 | B2 * | 1/2021 | Parshionikar | ........... G06F 1/163 |
| 10,895,875 | B2 | 1/2021 | Hashimoto et al. | |
| 10,915,100 | B2 | 2/2021 | Matsushita et al. | |
| 11,173,919 | B2 | 11/2021 | De Weser et al. | |
| 11,922,787 | B1 * | 3/2024 | Barcia | .................. G08B 21/043 |
| 2016/0012465 | A1 * | 1/2016 | Sharp | .................... G06Q 20/321 |
| | | | | 705/14.17 |
| 2019/0066424 | A1 * | 2/2019 | Hassani | ............. G07C 9/00857 |
| 2019/0121522 | A1 * | 4/2019 | Davis | ...................... G06V 40/28 |
| 2019/0137770 | A1 * | 5/2019 | Huang | .................... G06F 3/011 |
| 2024/0149884 | A1 * | 5/2024 | Barcia | .................. B60W 30/10 |

(Continued)

FOREIGN PATENT DOCUMENTS

| | | |
|---|---|---|
| JP | 2023-072268 A | 5/2023 |

*Primary Examiner* — Nigar Chowdhury
(74) *Attorney, Agent, or Firm* — SoraIP, Inc.

(57)                    ABSTRACT

An imaging state confirmation device for confirming an imaging state by an imaging device that images an image of a driver includes a position detection unit that detects a position of a facial image of the driver in an image imaged by the imaging device at an arbitrary point in time, an icon display unit that displays an icon in an arbitrary frame of the display device so as to correspond to a position of a facial image in the image, and a positional change display unit that changes a position of an icon in the frame of the display device and displays the icon based on an adjustment amount of a state of a seat on which the driver is seated or an adjustment amount of a state of the imaging device.

11 Claims, 5 Drawing Sheets

(56) References Cited

U.S. PATENT DOCUMENTS

| 2024/0149885 A1* | 5/2024 | Barcia | .................... | B60W 50/14 |
| 2024/0153380 A1* | 5/2024 | Barcia | .................... | G08G 1/166 |
| 2024/0155320 A1* | 5/2024 | Barcia | .................... | H04W 4/90 |
| 2024/0328805 A1* | 10/2024 | Li | ............................. | G06F 3/14 |
| 2024/0409113 A1* | 12/2024 | Aoki | ..................... | B60W 50/14 |
| 2025/0052863 A1* | 2/2025 | Mateus | ................. | G01S 7/4814 |
| 2025/0074307 A1* | 3/2025 | Goyal | ........................ | B60R 1/12 |
| 2025/0200998 A1* | 6/2025 | Higuchi | ............... | G06V 40/161 |
| 2025/0249924 A1* | 8/2025 | Kume | ............. | B60W 30/18009 |

* cited by examiner

IMAGING STATE CONFIRMATION DEVICE

CROSS-REFERENCE TO RELATED APPLICATION

This application claims priority to Japanese Patent Application No. 2023-211788 filed on Dec. 15, 2023, incorporated herein by reference in its entirety.

BACKGROUND

1. Technical Field

The present disclosure relates to an imaging state confirmation device.

2. Description of Related Art

Conventionally, there has been known a device for determining an abnormal state of a driver based on a facial image of the driver imaged by a camera (Japanese Unexamined Patent Application Publication No. 2023-072268 (JP 2023-072268 A)).

SUMMARY

However, depending on a seating state of the driver in a seat, a position of the face of the driver may deviate from an imaging range of the camera. In such a case, it becomes necessary to change a position of the seat in which the driver is seated, an orientation of the camera, or the like, in order to adjust the position of the face of the driver. However, if an adjustment operation is performed to adjust the position of the seat or the orientation of the camera, the position of the face of the driver may move during the adjustment operation, and in this case, it becomes difficult to appropriately adjust the position of the seat or the orientation of the camera.

In view of the above problems, an object of the present disclosure is to enable a driver to appropriately comprehend a position of the face of the driver in an imaged image, even during adjustment of the seat or the like.

The gist of the present disclosure is as follows.

(1) An imaging state confirmation device for confirming an imaging state by an imaging device that performs imaging of a driver includes a position detection unit for detecting a position of a facial image of the driver in an image imaged by the imaging device at an optional point in time, an icon display unit for displaying an icon so as to correspond to the position of the facial image in the image within an optional frame of a display device, and a positional change display unit for changing and displaying a position of the icon in the frame of the display device, based on an adjustment amount of a state of a seat in which the driver is seated, or an adjustment amount of a state of the imaging device.

(2) The imaging state confirmation device according to the above (1), further including a deviation amount calculation unit for calculating a deviation amount from an appropriate position or an appropriate range of the position of the facial image of the driver in the image imaged by the imaging device at the point in time, and a deviation amount correction unit for correcting the deviation amount based on the adjustment amount of the state of the seat in which the driver is seated or the adjustment amount of the state of the imaging device, in which the icon display unit and the positional change display unit determine a display position of the icon, based on the deviation amount.

(3) The imaging state confirmation device according to the above (1) or (2), in which the icon display unit displays, in the frame, the image imaged by the imaging device at the point in time.

(4) The imaging state confirmation device according to any one of the above (1) to (3), further including an imaging notification unit for notifying the driver regarding a seating posture before the point in time.

(5) The imaging state confirmation device according to the above (4), further including an image determination unit for determining whether the facial image of the driver is included in the image received from the imaging device such that a predetermined criterion is satisfied, and a warning notification unit for giving notification of a warning to the driver when the facial image of the driver is not included such that the predetermined criterion is satisfied, in which the imaging notification unit notifies the driver to take the seating posture for driving a vehicle after the notification of the warning by the warning notification unit, or simultaneously with the notification of the warning.

According to the present disclosure, the driver can comprehend a position of the face of the driver in an imaged image as appropriate, even during adjustment of the seat or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
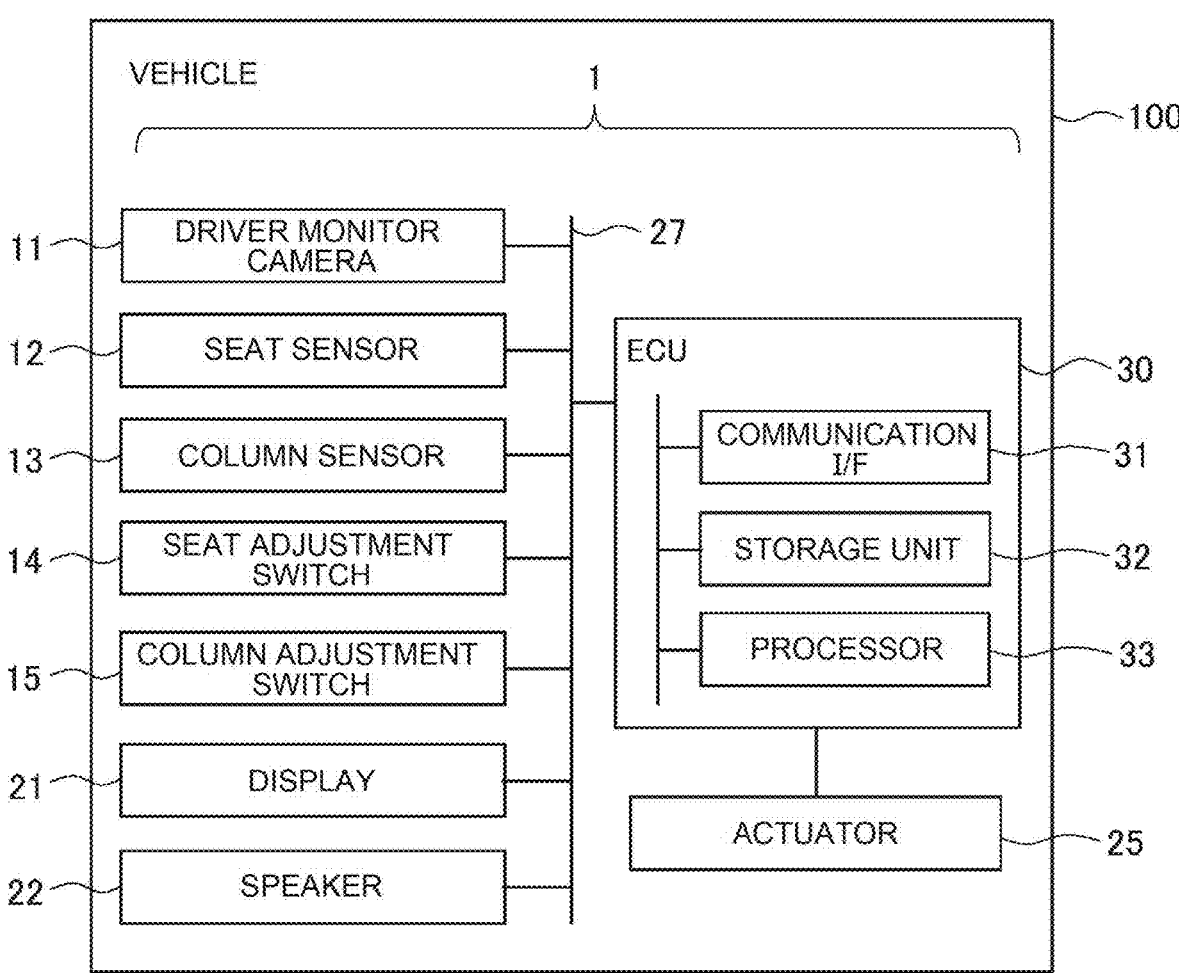
FIG. 1 is a schematic block diagram illustrating a configuration of a driver monitor system.

Hereinafter, embodiments will be described in detail with reference to the drawings. In the following description, the same reference numerals are given to the same constituent elements.

Configuration of the Device

Figure 2:
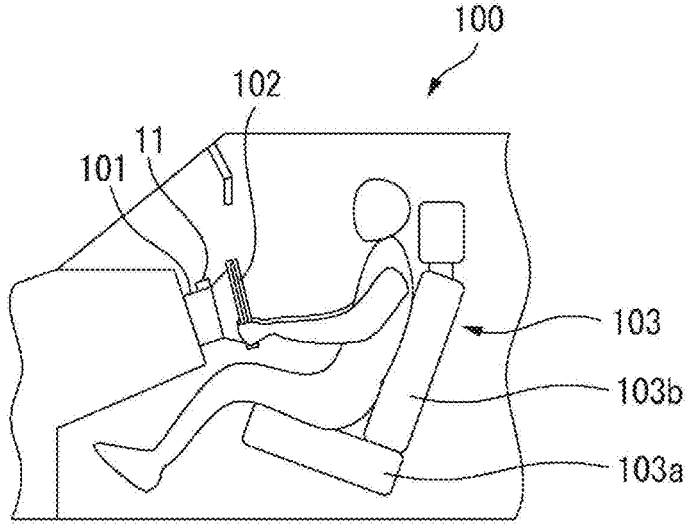
FIG. 2 is a schematic side view partially showing the interior of a vehicle equipped with a driver monitor system.

Referring to FIGS. 1 and 2, a configuration of a driver monitor system 1 including an imaging state confirmation device according to an embodiment will be described. FIG. 1 is a schematic block diagram illustrating a configuration of a driver monitor system 1. FIG. 2 is a schematic side view partially showing the inside of the vehicle 100 equipped with the driver monitor system 1.

The driver monitor system 1 is mounted on the vehicle 100 and monitors the state of the driver of the vehicle 100. As illustrated in FIG. 2, the vehicle 100 includes a steering wheel 102 attached via a steering column 101, and a driver seat 103 on which a driver is seated. The driver seat 103 includes a seat cushioning 103*a* and a seat back 103*b*.

As illustrated in FIG. 1, in the present embodiment, the driver monitor system 1 includes a driver monitor camera 11, a seat sensor 12, a column sensor 13, a seat adjustment switch 14, a column adjustment switch 15, and a display 21. Further, the driver monitor system 1 includes a speaker 22, an actuator 25, and an electronic control unit (hereinafter, referred to as "ECU") 30.

The driver monitor camera 11, the seat sensor 12, the column sensor 13, the seat adjustment switch 14, the column adjustment switch 15, the display 21, the speaker 22, the actuator 25, and ECU 30 are communicably connected via, for example, the in-vehicle network 27. The in-vehicle network 27 is, for example, a network conforming to a standard such as a controller area network (CAN).

The driver monitor camera 11 is an example of an imaging device that images an image of a driver. In the present embodiment, the driver monitor camera 11 is provided at an upper portion of the steering column 101, and is arranged toward the driver so that the driver can be imaged, specifically, a face and a part of the upper body of the driver. In the present embodiment, the driver monitor camera 11 is arranged so as to perform imaging toward the rear of the vehicle 100, that is, in a direction from the steering wheel 102 toward the driver seat 103.

The driver monitor camera 11 includes a camera and a projector. For example, the camera is a complementary metal-oxide-semiconductor (CMOS) camera or a charge-coupled device (CCD) camera, and the projector is a light emitting diode (LED). In addition, the projector is preferably in a near-infrared LED so that the driver's face can be photographed without causing discomfort to the driver even at low illuminance, such as at night, and the camera is also preferably capable of detecting near-infrared rays. For example, the projector may be two near-infrared LED located on either side of the camera. Further, the camera may be provided with a filter such as a visible light cut filter. The driver monitor camera 11 outputs images imaged at predetermined intervals to ECU 30 via the in-vehicle network 27.

The driver monitor camera 11 may be provided at a position different from the upper part of the steering column 101 as long as the driver of the vehicle 100 can be imaged. For example, the driver monitor camera 11 may be provided in a steering wheel 102, a room mirror, a meter panel, a meter hood, or the like of the vehicle 100.

The seat sensor 12 is an example of a detector that detects a state of the driver seat 103 on which the driver is seated. Specifically, adjustable parameters of the driver seat 103 are detected. For example, the seat sensor 12 detects a position of the driver seat 103 in the vehicle front-rear direction, a position in the vehicle up-down direction, an angle of the seat back 103*b*, an angle of the seat cushioning 103*a*, and the like. The seat sensor 12 outputs the detection result to ECU 30 via the in-vehicle network 27.

The column sensor 13 is an example of a detector that detects a state of the steering column 101 to which the driver monitor camera 11 is attached. Specifically, adjustable parameters of the steering column 101 are detected. For example, the column sensor 13 detects a tilt angle of the steering column 101, a position in the vehicle front-rear direction, and the like. The column sensor 13 outputs the detection result to ECU 30 via the in-vehicle network 27.

The seat adjustment switch 14 is an example of a device for the user to adjust the state of the driver seat 103. Specifically, the seat adjustment switch 14 is used to electrically adjust an adjustable parameter of the driver seat 103. Therefore, when the driver presses the seat adjustment switch 14, the driver seat 103 can be moved in the front-rear direction or the up-down direction, or the seat back 103*b* or the seat cushioning 103*a* can be changed. The seat adjustment switch 14 outputs a driver-operated signal to ECU 30 via the in-vehicle network 27.

The column adjustment switch 15 is an example of a device for the user to adjust the state of the steering column 101. The column adjustment switch 15 is used to electrically adjust the adjustable parameters of the steering column 101. Therefore, when the driver presses the column adjustment switch 15, the tilt angle and the position of the steering column 101 in the front-rear direction are changed. As a result, the imaging direction and the imaging position of the driver monitor camera 11, that is, the state of the driver monitor camera 11 are changed. The column adjustment switch 15 outputs a driver-operated signal to ECU 30 via the in-vehicle network 27.

The display 21 is an example of a display device that displays an image. The display 21 is any type of display device such as a liquid crystal display or an organic EL display. The display 21 is arranged so that at least the driver can check the screen. Therefore, the display 21 is disposed, for example, on an instrument panel, a meter panel, or the like of the vehicle 100. The display 21 receives an image signal from ECU 30 via the in-vehicle network 27, and displays an image in accordance with the image signal. Note that the vehicle 100 may include other types of display devices, such as a head-up display, instead of the display 21 or in addition to the display 21, as display devices.

The speaker 22 is an example of a device that outputs sound. The speaker 22 receives an audio signal from ECU 30 via the in-vehicle network 27, and outputs audio in accordance with the audio signal.

The actuator 25 is an example of a device for changing the state of the driver seat 103 and the state of the steering column 101. The actuator 25 changes the adjustable parameters of the driver seat 103 in accordance with the signal from ECU 30. Specifically, the actuator 25 moves the driver seat 103 in the front-rear direction or the up-down direction, or changes the angle of the seat back 103*b* or the angle of the seat cushioning 103*a*. The actuator 25 also changes the adjustable parameters of the steering column 101 in response to a signal from ECU 30. Specifically, the actuator 25 changes the tilt angle and the position of the steering column 101 in the front-rear direction.

In the present embodiment, the actuator 25 is connected to ECU 30, but may be directly connected to the seat adjustment switch 14 and the column adjustment switch 15. In addition, the adjustment of the state of the driver seat 103 and the adjustment of the state of the steering column 101 may be performed manually instead of electrically driven. In this case, the seat adjustment switch 14, the column adjustment switch 15, and the actuator 25 are not provided.

ECU 30 controls images displayed on the display 21 and sounds outputted from the speaker 22. Further, ECU 30 functions as an imaging state confirmation device for checking an imaging state by the driver monitor camera 11. As illustrated in FIG. 1, ECU 30 includes a communication interface 31, a storage unit 32, and a processor 33.

The communication interface 31 is a circuit for connecting ECU 30 to the in-vehicle network 27 and the actuator 25.

The storage unit 32 stores data. The storage unit 32 includes, for example, at least one of a volatile semiconductor memory, a nonvolatile semiconductor memory, a hard disk drive (HDD), and a solid state drive (SSD). The storage unit 32 stores a program to be executed by the processor 33 of ECU 30. The storage unit 32 stores data transmitted from the driver monitor camera 11 and the like.

The processor 33 comprises one or more central processing units (CPU) and peripheral circuitry. The processor 33 may further include other arithmetic circuits such as a logical arithmetic unit or a numerical arithmetic unit. The processor 33 executes a program stored in the storage unit 32.

Figure 3:
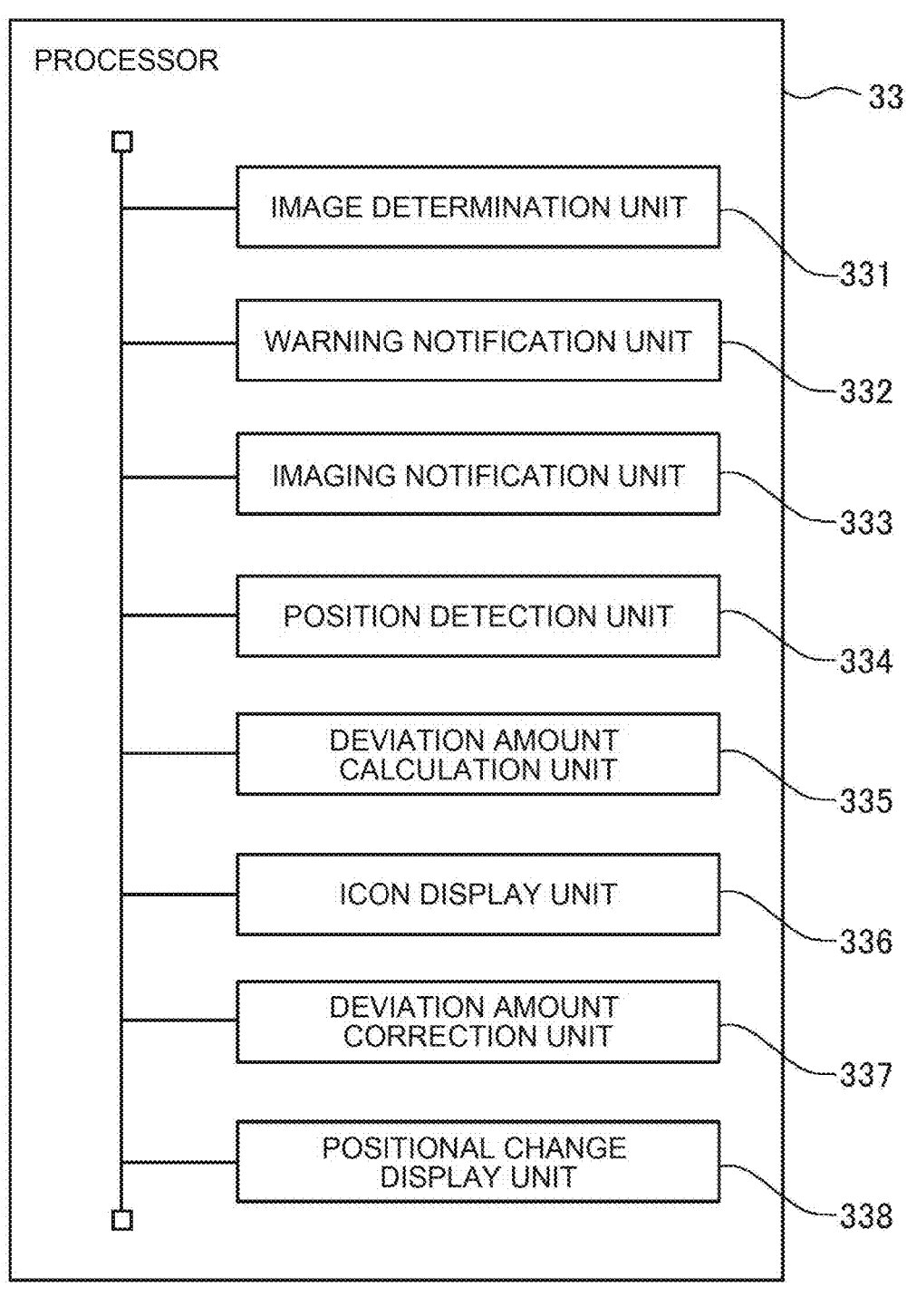
FIG. 3 is a functional diagram of a processor of an ECU.

FIG. 3 is a functional diagram of the processor 33 of ECU 30. As illustrated in FIG. 3, the processor 33 includes an image determination unit 331, a warning notification unit 332, an imaging notification unit 333, a position detection unit 334, a deviation amount calculation unit 335, an icon display unit 336, a deviation amount correction unit 337, and a positional change display unit 338.

The image determination unit 331 determines whether or not the facial image of the driver satisfies a predetermined criterion in the image received from the driver monitor camera 11. When the image determination unit 331 determines that the facial image of the driver does not satisfy the predetermined criterion, the warning notification unit 332 notifies the driver of the warning. The imaging notification unit 333 notifies the driver of the seating posture for driving the vehicle after the notification of the warning by the warning notification unit 332 or at the same time as the notification of the warning. The position detection unit 334 detects the position of the facial image of the driver in the image imaged by the driver monitor camera 11 at an arbitrary point in time after the notification is performed by the imaging notification unit 333. The deviation amount calculation unit 335 calculates a deviation amount from an appropriate position or an appropriate range of the position of the facial image of the driver in the image imaged by the driver monitor camera 11 at the above-described point in time. The icon display unit 336 displays an icon in an arbitrary frame of the display 21 so as to correspond to the position of the facial image in the image imaged by the driver monitor camera 11. In addition, the icon display unit 336 also displays an image imaged by the driver monitor camera 11 in such a frame. The deviation amount correction unit 337 corrects the deviation amount based on the adjustment amount of the state of the driver seat 103 or the adjustment amount of the state of the driver monitor camera 11. In addition, the positional change display unit 338 changes and displays the position of the icon in the frame of the driver monitor camera 11 based on the adjustment amount of the state of the driver seat 103 or the adjustment amount of the state of the driver monitor camera 11. These units included in the processor 33 are, for example, functional modules realized by a computer program running on the processor 33. Alternatively, each unit included in the processor 33 may be a dedicated arithmetic circuit provided in the processor 33.

Overview of the Imaging Status Confirmation Process

Figure 4A:
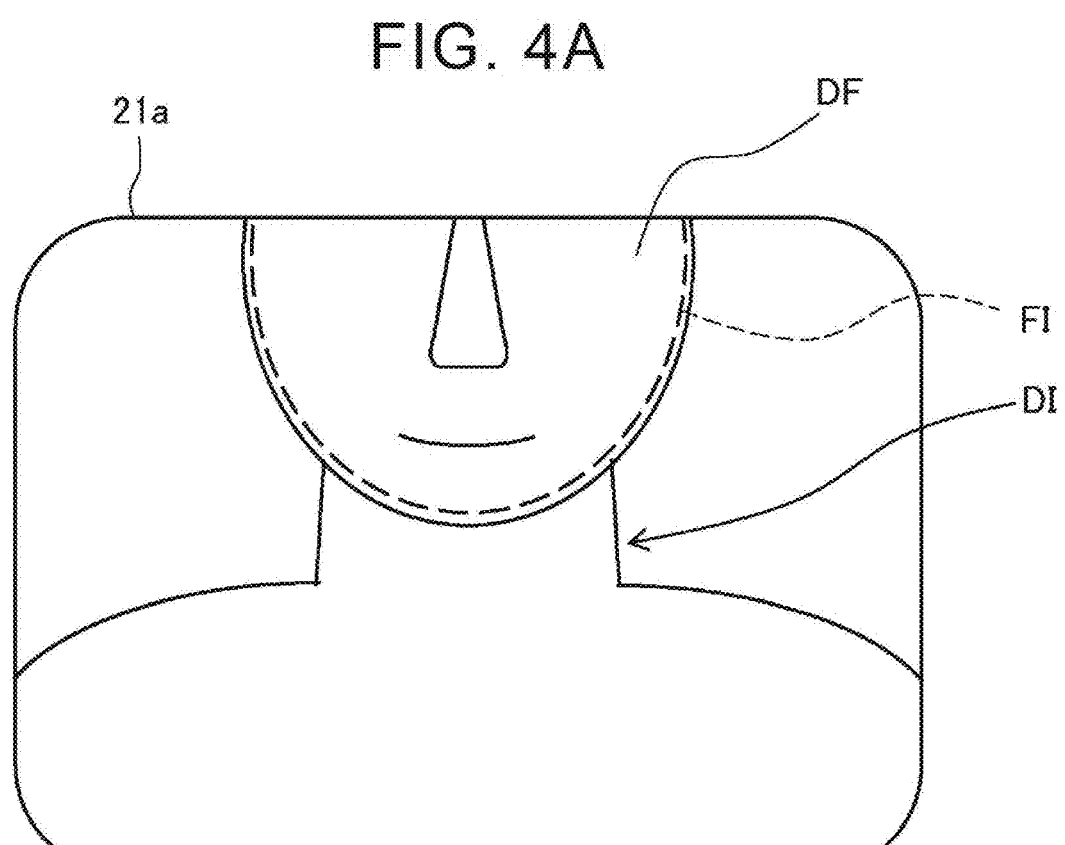
FIG. 4A is a diagram illustrating an example of an image displayed on a display.
Figure 4B:
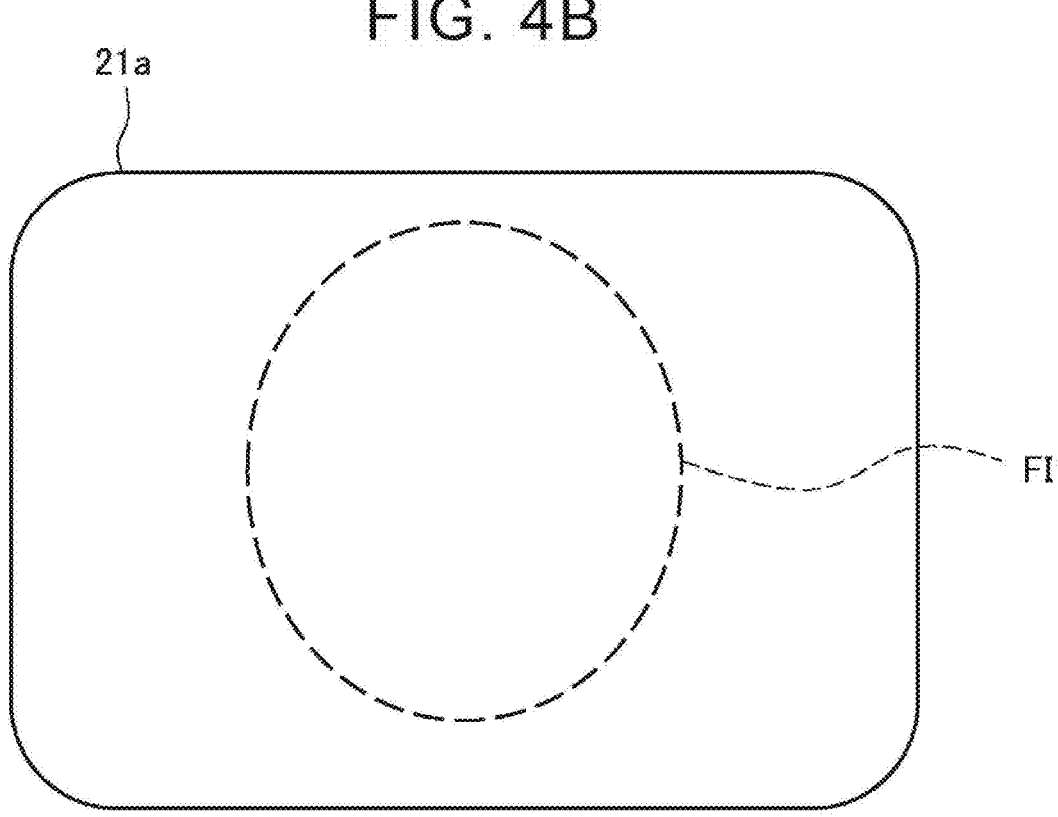
FIG. 4B is a diagram illustrating an example of an image displayed on a display.

Next, the imaging status checking process according to the present embodiment will be described referring to FIG. 4A and FIG. 4B. FIG. 4A and FIG. 4B are diagrams illustrating exemplary images displayed on a screen 21a of the display 21.

FIG. 4A illustrates a state in which an image imaged by the driver monitor camera 11 is displayed on the screen 21a of the display 21. In FIG. 4A, a solid line indicates a driver image DI appearing in an image imaged by the driver monitor camera 11, and a broken line indicates an icon FI. In the embodiment shown in FIG. 4A, the driver monitor camera 11 has an angle of view that is too low with respect to the driver, so that the driver monitor camera 11 does not show the upper portion of the driver's face. Consequently, the image displayed on the screen 21a of the display 21 shown in FIG. 4A does not include the upper part of the facial image DF of the driver in the driver image DI.

By the way, the image imaged by the driver monitor camera 11 is used for, for example, detection of dozing of a driver, detection of inattentiveness of a driver, detection of an abnormal state of a driver, and the like by performing image processing. However, in order to perform such detection, an image of the entire face of the driver needs to be included in an image imaged by the driver monitor camera 11. However, if a part of the facial image DF of the driver is not included in the image imaged by the driver monitor camera 11 as shown in FIG. 4A, such detection cannot be appropriately performed. Therefore, it is necessary to adjust the state of the driver seat 103 or the state of the steering column 101 (that is, the state of the driver monitor camera 11) so that the image imaged by the driver monitor camera 11 includes the image of the entire face of the driver.

Here, in the present embodiment, as shown in FIG. 4A, an icon FI is displayed at a position corresponding to the facial image DF of the driver. In particular, in the present embodiment, an icon FI having a circular shape or an elliptical shape corresponding to the outline of the facial image DF of the driver is displayed. For example, the facial image included in the image is recognized by performing arbitrary image recognition processing on the image imaged by the driver monitor camera 11. The icon FI is displayed at a position corresponding to the facial image DF of the driver by arranging the icon FI in accordance with the recognized facial image. In particular, in the embodiment shown in FIG. 4A, since the image imaged by the driver monitor camera 11 does not include a part of the facial image DF of the driver, the icon FI also has an elliptical shape with a part missing.

Thereafter, the icon FI is moved based on the adjustment amount of the state of the driver seat 103 or the adjustment amount of the state of the steering column 101. In particular, the icon FI moves to correspond to a change in the position of the driver's facial image in the image imaged by the driver monitor camera 11 associated with adjusting the condition of the driver seat 103 or adjusting the condition of the steering column 101. Therefore, for example, when the vertical position of the driver seat 103 is lowered, the position of the icon FI in the screen 21a of the display 21 is lowered. Further, for example, when the tilt angle of the steering column 101 is increased (the shooting direction of the driver monitor camera 11 is moved upward), the position of the icon FI in the screen 21a of the display 21 is lowered. As described above, when the position of the icon FI in the screen 21a of the display 21 is lowered, the icon FI fits within the screen 21a of the display 21 as shown in FIG. 4B. As a result, the driver's doze, inattentiveness, and abnormal condition can be appropriately detected by the image imaged by the driver monitor camera 11.

When the driver performs an adjustment operation to adjust the state of the driver seat 103 or the steering column 101, the position of the driver's face may move during the adjustment operation. Therefore, when an image imaged by the driver monitor camera 11 is displayed on the screen 21a of the display 21 in real time, the driver cannot adjust the status of the driver seat 103 or the steering column 101 appropriately. On the other hand, in the present embodiment, the icon FI corresponding to the facial image DF of the driver is displayed in the screen 21a of the display 21, and the position of the icon FI is changed as the state of the driver seat 103 or the state of the steering column 101 is adjusted. The position of the icon FI does not change even if the position of the driver's face changes in accordance with the adjusting operation. Therefore, the driver can adjust the state of the driver seat 103 and the steering column 101 so that the facial image of the driver is included in the image imaged by the driver monitor camera 11.

Note that, in FIG. 4A, the image imaged by the driver monitor camera 11 is displayed on the entire screen 21a of the display 21 (that is, in the frame of the entire screen 21a). However, the image imaged by the driver monitor camera 11 may be displayed in a part of the frame of the screen 21a of the display 21. In this case, the icon FI moves within a part of the frame as the state of the driver seat 103 or the state of the steering column 101 is adjusted.

Specific Control

Figure 5:
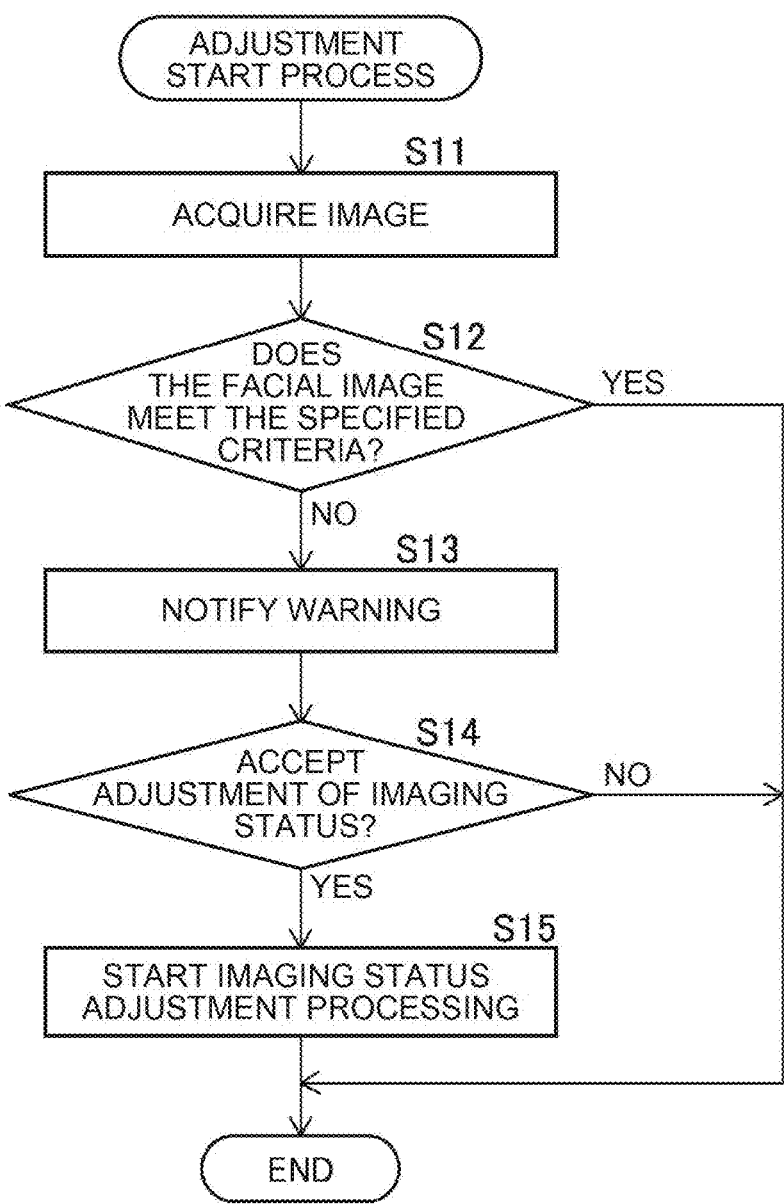
FIG. 5 is a flow chart showing a flow of an adjustment start process for starting the imaging status adjustment process.

Next, a specific control will be described with reference to FIGS. 5 and 6. FIG. 5 is a flowchart illustrating a flow of an adjustment start process for starting an imaging state adjustment process to be described later. The coordination initiation process is periodically executed by ECU 30 processor 33.

As illustrated in FIG. 5, when the adjustment-start process is executed, first, the image determination unit 331 acquires an image currently imaged by the driver monitor camera 11 (S11). Images imaged by the driver monitor camera 11 are transmitted to ECU 30 via the in-vehicle network 27 and stored in the storage unit 32. The image determination unit 331 acquires the current image from the storage unit 32.

Next, the image determination unit 331 determines whether or not the facial image of the drivers is included in the image acquired in S11 so as to satisfy a predetermined criterion (S12). Specifically, for example, the image determination unit 331 recognizes the facial image included in the image acquired in S11 by an arbitrary image recognition process. The facial image recognized at this time includes not only an image of the entire face but also an image of a part of the face. Then, the image determination unit 331 determines whether the facial image recognized in this way satisfies the criteria necessary for detecting the driver's doze, inattentiveness, and abnormal state. Specifically, for example, the image determination unit 331 determines whether or not a part (for example, both eyes, nose, mouth) necessary for detecting the state of the face (opening and closing of the eye, direction of the line of sight, direction of the face, and the like) is included in the facial image. In this case, the image determination unit 331 determines that the facial image of the driver satisfies a predetermined criterion when all parts necessary for detecting the state of the face are included in the facial image. On the other hand, when a part of a part necessary for detecting the state of the face is not included in the facial image, the image determination unit 331 determines that the facial image of the driver does not satisfy a predetermined criterion. The criterion to be satisfied by the facial image may be a criterion different from the above-described criterion (that is, whether or not a part necessary for detecting the state of the face is included in the facial image) as long as the criterion is necessary for detecting the doze, inattentiveness, and abnormal state of the driver.

When it is determined in S12 that the facial image of the driver is included so as to satisfy a predetermined criterion, the facial image of the driver is appropriately imaged, and thus the adjusting-start process is ended. In this case, imaging state adjustment processing described later is not executed.

On the other hand, when it is determined in S12 that the facial images of the driver are not included so as to satisfy the predetermined criterion, the warning notification unit 332 causes the driver to notify the warning (S13). In the present embodiment, the warning notification unit 332 notifies the driver of a warning indicating that the driver's face cannot be recognized by the driver monitor camera 11. Specifically, the warning notification unit 332 causes the display 21 to display such a warning, and causes the speaker 22 to output sound representing such a warning.

In addition, the warning notification unit 332 notifies the driver of an inquiry as to whether or not adjustment of the imaging state may be started, and determines whether or not the driver has accepted adjustment of the imaging state (S14). Specifically, the warning notification unit 332 causes the display 21 to display such an inquiry, an accept button, and a reject button, for example. Then, the warning notification unit 332 determines that the driver has accepted the adjustment of the imaging state when the acceptance button is pressed by the driver. On the other hand, the warning notification unit 332 determines that the driver has rejected the adjustment of the imaging state when the rejection button is pressed by the driver.

When it is determined in S14 that the driver has accepted the adjustment of the imaging state, an imaging state adjustment process to be described later is started (S15). On the other hand, when it is determined in S14 that the driver has refused to adjust the imaging state, the adjustment start process is terminated without starting the imaging state adjustment process. In this case, the timing of executing the next adjustment-start process may be delayed until any timing (for example, when the ignition switch of the vehicle 100 is turned ON the next time).

Figure 6:
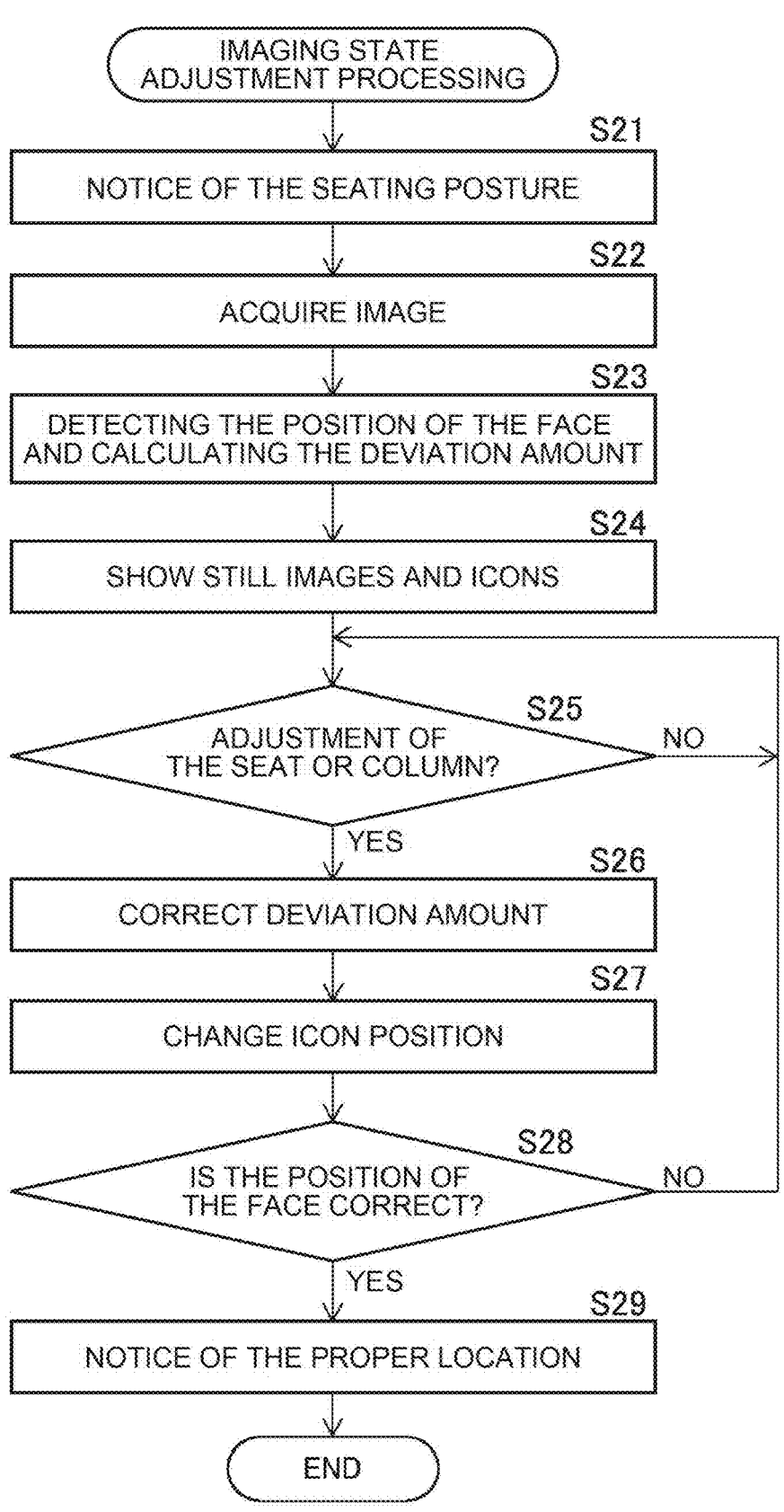
FIG. 6 is a flowchart illustrating a flow of an imaging state adjustment process for adjusting an imaging state.

FIG. 6 is a flowchart illustrating a flow of an imaging state adjustment process for adjusting an imaging state. The imaging status adjustment processing is executed by the processor 33 of ECU 30 when the adjustment starting processing illustrated in FIG. 5 proceeds to S15.

As illustrated in FIG. 6, when the imaging state adjusting process is started, first, the imaging notification unit 333 notifies the drivers of the seating posture (S21). Specifically, the imaging notification unit 333 notifies the driver of the seating posture for driving the vehicle. For example, the imaging notification unit 333 causes the display 21 to display a message requesting that the vehicle be in a seating posture for driving the vehicle, and causes the speaker 22 to output a voice requesting the message. More specifically, the imaging notification unit 333 causes the display 21 to display a message requesting that the headrest be placed on the head and be stationary, and causes the speaker 22 to output a voice requesting such a request. Further, in the present embodiment, the imaging notification unit 333 notifies the driver of the timing of imaging after the notification regarding the seating posture. Specifically, the imaging notification unit 333 causes the display 21 to display a countdown until the imaging timing, and outputs sound from the speaker 22.

Next, the position detection unit 334 acquires images imaged by the driver monitor camera 11 at any one point in time from the storage unit 32 (S22). An arbitrary point in time is, for example, a point in time after the notification regarding the seating posture in S21 is made. In particular, in the present embodiment, an arbitrary point in time is a point in time immediately after the imaging notification unit 333 notifies the driver of the timing of imaging. Therefore, in the present embodiment, the position detection unit 334 acquires, from the storage unit 32, an image imaged by the driver monitor camera 11 immediately after the imaging notification unit 333 notifies the driver of the timing of imaging.

Next, the position detection unit 334 detects the position of the facial image of the drivers in the image acquired in S22 (S23). Similar to S12 described above, the position detection unit 334 recognizes the facial image included in the image acquired in S22 by an optional image recognition process. In addition, the position detection unit 334 calculates the position of the facial image of the drivers in the image acquired in S22. Specifically, for example, the position detection unit 334 estimates coordinates of a position serving as a center of a face from the recognized facial image.

In addition, in the present embodiment, the deviation amount calculation unit 335 calculates a deviation amount from an appropriate position or an appropriate range of the position of the facial image of the drivers in the image acquired in S22 (S23). The deviation amount calculation unit 335 calculates, as a deviation amount, a distance between an appropriate position of the facial image set in advance (for example, a position that is the center of the acquired image in S22) and a position of the facial image detected by the position detection unit 334. Alternatively, the deviation amount calculation unit 335 calculates, as a deviation amount, a distance from a preset proper range of the facial image (for example, a certain range close to the center of the image acquired in S22) to the position of the facial image detected by the position detection unit 334.

Next, the icon display unit 336 causes the icon FI to be displayed at a position corresponding to the position of the facial image of the driver in the image acquired in S22 within an arbitrary frame (in the present embodiment, the entire screen 21a) of the screen 21a of the display 21 (S24). In particular, in the present embodiment, the icon display unit 336 determines the display position of the icon FI based on the deviation amount calculated by the deviation amount calculation unit 335. Consequently, FI is displayed at the appropriate position or a position deviated from the appropriate range by the deviation amount. In addition, in the present embodiment, the icon display unit 336 also displays images acquired by S22 within an arbitrary frame of the screen 21a of the display 21. As a consequence, images as shown in FIG. 4A are displayed on the display 21.

Then, the deviation amount correction unit 337, the deviation amount correction unit 337, based on the output signal from the seat sensor 12 and the column sensor 13, determines whether the state of the state or the steering column 101 of the driver seat 103 is adjusted (S25). While it is determined that the state of the driver seat 103 and the state of the steering column 101 have not been adjusted, S25 is repeated.

On the other hand, when it is determined that the state of the driver seat 103 and the state of the steering column 101 have been adjusted in S25, the deviation amount correction unit 337 corrects the deviation amount based on the adjustment amount of the state of the driver seat 103 or the adjustment amount of the state of the steering column 101. In the present embodiment, the deviation amount correction unit 337 corrects the deviation amount by an amount corresponding to the amount of change in the position of the face of the driver accompanying the adjustment of the state of the driver seat 103 or the adjustment of the state of the steering column 101. Therefore, for example, when the driver seat 103 moves downward by a predetermined amount, the amount of vertical deviation amount is corrected by an amount corresponding to the amount of movement.

Next, the positional change display unit 338 changes and displays the position of the icon FI in the screen 21a of the display 21 based on the adjustment amount of the state of the driver seat 103 or the adjustment amount of the state of the steering column 101 (S27). In the present embodiment, similarly to S24, the positional change display unit 338 determines the display position of the icon FI based on the deviation amounts corrected by S25. Consequently, the icon FI is displayed while being moved by an amount corresponding to the adjustment amount of the state of the driver seat 103 or the adjustment amount of the state of the steering column 101.

Next, the positional change display unit 338 determines whether or not the position of the driver's face is appropriate (S28). In the present embodiment, the positional change display unit 338 determines whether or not the position of the driver's face is appropriate based on whether or not the deviation amount corrected in S25 is equal to or less than a predetermined reference value. When the deviation amount corrected in S25 is larger than the predetermined reference value, it means that the position of the face is still deviated from the proper position or the proper range, and therefore, it is determined that the position of the face is not appropriate. On the other hand, when the deviation amount corrected in S25 is equal to or less than the predetermined reference value, it means that the position of the face is within the proper position or the proper range or is close to the proper position or the proper range, and therefore, it is determined that the position of the face is appropriate.

If it is determined in S28 that the facial position is not correct, the process returns to S25. On the other hand, when it is determined in S28 that the position of the face is proper, the positional change display unit 338 notifies the drivers that the face is in the proper position. Specifically, the positional change display unit 338 causes the display 21 to display a message indicating that the face is in the proper position and that no further adjustment is necessary, and causes the speaker 22 to output a sound indicating that the face is in the proper position.

Modification

In the above-described embodiment, in S24 of FIG. 6, the icon display unit 336 displays images acquired in S22 in addition to the icon FI in an arbitrary frame of the screen 21a of the display 21. However, the icon display unit 336 may display only the icon FI without displaying the images acquired in S22. In addition, the icon display unit 336 and the positional change display unit 338 may display the present deviation amount in addition to the icon FI.

In the above-described embodiment, the deviation amount is calculated by the deviation amount calculation unit 335, and the deviation amount is corrected by the deviation amount correction unit 337. However, the deviation amount may not be calculated. In this case, the icon display unit 336 displays the icon FI at a position corresponding to the position of the facial images calculated by the position detection unit 334. In addition, the positional change display unit 338 changes the display position of the icon FI based on the adjustment amount of the state of the driver seat 103 or the adjustment amount of the state of the steering column 101.

Further, in the above-described embodiment, the notification regarding the seating posture of S21 is performed after the warning by the warning notification unit 332 in S13. However, the notification regarding the seating posture of S21 may be performed simultaneously with the warning by the warning notification unit 332 in S13. In this case, an inquiry is not made as to whether or not the imaging state in S14 may be adjusted. Therefore, if it is determined in S12 that the facial images of the drivers do not satisfy the predetermined criterion, the imaging condition adjusting process is started.

While preferred embodiments according to the present disclosure have been described above, the present disclosure is not limited to these embodiments, and various modifications and changes can be made within the scope of the claims.

What is claimed is:

1. An imaging state confirmation device comprising a processor configured to:

acquire a first image of a driver that is captured by an imaging device; and execute an adjustment process according to a state of a first facial image of the driver within the first image, the adjustment process including acquiring a second image of the driver that is captured by the imaging device, detecting a position of a second facial image of the driver within the second image, displaying, on a display device, the second image and an icon within a predetermined frame, the icon being positioned to indicate the detected position of the second facial image, determining whether at least one of the imaging device or a seat in which the driver is seated has been moved, acquiring a movement amount of the imaging device, the seat, or both of the imaging device and the seat, in response to a determination that at least one of the imaging device or the seat has been moved, determining an updated position of the icon within the predetermined frame based on the acquired movement amount, and moving the icon displayed on the display device to the determined updated position.

2. The imaging state confirmation device according to claim 1, wherein the adjustment process further includes calculating a deviation amount from an appropriate position or an appropriate range of the position of the second facial image of the driver, and correcting the deviation amount based on the acquired movement amount, the icon is positioned based on the deviation amount, and the updated position is determined based on the corrected deviation amount.

3. The imaging state confirmation device according to claim 1, wherein the processor is further configured to output notification regarding a seating posture based the state of the first facial image.

4. The imaging state confirmation device according to claim 1, wherein the processor is further configured to determine whether the first facial image of the driver satisfies a predetermined criterion, and the adjustment process is executed in a case where a determination that the first facial image of the driver does not satisfy the predetermined criterion.

5. The imaging state confirmation device according to claim 2, wherein the adjustment process further includes determining whether the corrected deviation amount is equal to or less than a predetermined reference value, and outputting a message notifying that a face of the driver is at the appropriate position or within the appropriate range, in response to a determination that the corrected deviation amount is equal to or less than the predetermined reference value.

6. The imaging state confirmation device according to claim 3, wherein the processor is further configured to receive an authorization to start the adjustment process from the driver after outputting the notification, and the adjustment process is executed in response to the authorization.

7. The imaging state confirmation device according to claim 3, wherein the notification includes a warning and a message, the warning notifying the driver that a face of the driver is not recognized, and the message requiring that the driver take the seating posture for driving.

8. The imaging state confirmation device according to claim 7, wherein the processor is further configured to determine whether the first facial image of the driver satisfies a predetermined criterion, the warning is output in response to a determination that the first facial image of the driver does not satisfy the predetermined criterion, the message is output after or simultaneously with outputting the warning, and the adjustment process is executed after outputting the warning.

9. The imaging state confirmation device according to claim 8, wherein the processor is further configured to receive an authorization to start the adjustment process from the driver after outputting the warning, and the adjustment process is executed in response to the authorization.

10. The imaging state confirmation device according to claim 1, wherein the adjustment process further includes notifying the driver of a timing for capturing the second image by displaying a countdown on the display device.

11. The imaging state confirmation device according to claim 1, wherein the icon has a shape corresponding to an outline of the second facial image of the driver.

* * * * *